United States Patent
Pasternack et al.

(10) Patent No.: US 11,658,926 B2
(45) Date of Patent: May 23, 2023

(54) GENERATING SMART REPLIES INVOLVING IMAGE FILES

(71) Applicant: Microsoft Technology Licensing, LLC, Redmond, WA (US)

(72) Inventors: Jeffrey William Pasternack, Belmont, CA (US); Christopher Szeto, Mountain View, CA (US); Arpit Dhariwal, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 310 days.

(21) Appl. No.: 16/019,925

(22) Filed: Jun. 27, 2018

(65) Prior Publication Data
US 2020/0007475 A1 Jan. 2, 2020

(51) Int. Cl.
| | |
|---|---|
| *H04L 51/046* | (2022.01) |
| *G06F 16/58* | (2019.01) |
| *G06F 16/532* | (2019.01) |
| *G06F 16/951* | (2019.01) |
| *G06F 16/56* | (2019.01) |
| *H04L 51/10* | (2022.01) |

(52) U.S. Cl.
CPC .......... *H04L 51/046* (2013.01); *G06F 16/532* (2019.01); *G06F 16/56* (2019.01); *G06F 16/5866* (2019.01); *G06F 16/951* (2019.01); *H04L 51/10* (2013.01)

(58) Field of Classification Search
CPC ... H04L 51/046; H04L 51/10; G06F 16/5866; G06F 16/532; G06F 16/951; G06F 16/56
See application file for complete search history.

(56) References Cited

U.S. PATENT DOCUMENTS

| | | |
|---|---|---|
| 10,366,111 B1 | 7/2019 | Florissi et al. |
| 11,062,084 B2 | 7/2021 | Pasternack et al. |

(Continued)

FOREIGN PATENT DOCUMENTS

| | | |
|---|---|---|
| CN | 104620240 A | 5/2015 |
| CN | 107870974 A | 4/2018 |
| JP | 2016212860 A | 12/2016 |

OTHER PUBLICATIONS

"International Search Report and Written Opinion Issued in PCT Application No. PCT/US19/037573", dated Aug. 28, 2019, 13 Pages.

(Continued)

*Primary Examiner* — Scott B Christensen
(74) *Attorney, Agent, or Firm* — Schwegman, Lundberg & Woessner, P.A.

(57) ABSTRACT

Techniques for generating smart replies involving image files are disclosed herein. In some example embodiments, a computer system detects that a first message comprising a first image file has been transmitted from a first computing device of a first user to a second computing device of a second user, and generates a first plurality of smart replies based on a first embedding vector of the first image file, where the first embedding vector of the first image file is based on at least one of first textual metadata of the first image file, first image data of the first image file, and a first set of query text used by a first set of users in a first set of searches that resulted in the first image file being included in a first set of transmitted messages.

19 Claims, 16 Drawing Sheets

(56) References Cited

U.S. PATENT DOCUMENTS

| | | | |
|---|---|---|---|
| 2008/0096534 A1* | 4/2008 | Yoon | H04M 1/72555 455/412.1 |
| 2008/0152231 A1* | 6/2008 | Gokturk | G06Q 30/08 382/209 |
| 2010/0093379 A1 | 4/2010 | Neely et al. | |
| 2010/0205202 A1* | 8/2010 | Yang | G06F 16/532 707/E17.03 |
| 2011/0173174 A1* | 7/2011 | Flitcroft | G06F 16/951 707/707 |
| 2011/0238645 A1* | 9/2011 | Zhang | G06Q 30/0601 707/706 |
| 2012/0179704 A1* | 7/2012 | Xu | G06F 16/355 707/766 |
| 2012/0323928 A1 | 12/2012 | Bhatia | |
| 2013/0232173 A1 | 9/2013 | Maruyama et al. | |
| 2014/0280363 A1 | 9/2014 | Heng et al. | |
| 2015/0032725 A1 | 1/2015 | Barykin et al. | |
| 2017/0060924 A1 | 3/2017 | Fitzhardinge | |
| 2017/0195269 A1* | 7/2017 | Miklos | H04L 51/02 |
| 2017/0371947 A1 | 12/2017 | Golander et al. | |
| 2018/0014167 A1 | 1/2018 | Rubinstein | |
| 2018/0034755 A1 | 2/2018 | Saoji et al. | |
| 2018/0039406 A1* | 2/2018 | Kong | G06F 16/951 |
| 2018/0083898 A1 | 3/2018 | Pham | |
| 2018/0083901 A1 | 3/2018 | McGregor, Jr. et al. | |
| 2018/0089588 A1 | 3/2018 | Ravi et al. | |
| 2018/0210874 A1* | 7/2018 | Fuxman | G06F 17/2785 |
| 2018/0233132 A1 | 8/2018 | Herold et al. | |
| 2018/0268010 A1 | 9/2018 | Park et al. | |
| 2020/0004825 A1 | 1/2020 | Pasternack et al. | |
| 2021/0312126 A1 | 10/2021 | Pasternack et al. | |

OTHER PUBLICATIONS

"Non Final Office Action Issued in U.S. Appl. No. 16/020,148", dated Nov. 24, 2020, 19 Pages.

"International Search Report and Written Opinion Issued in PCT Application No. PCT/US19/032552", dated Aug. 16, 2019, 12 Pages.

"First Office Action and Search Report Issued in Chinese Patent Application No. 201980043498.0", dated Dec. 28, 2021, 19 Pages.

"Second Office Action Issued in Chinese Patent Application No. 201980043498.0", dated Jul. 5, 2022, 24 Pages.

"U.S. Appl. No. 17/352,978, Notice of Allowance dated Mar. 3, 2022", 9 pgs.

"Final Office Action Issued in Chinese Patent Application No. 201980043498.0", dated Jan. 11, 2023, 23 Pages.

"Notice of Allowance Issued in European Patent Application No. 19742502.8", dated Jan. 25, 2023, 8 Pages.

"Summons to Attend Oral Proceedings Issued in European Patent Application No. 19729601.5", dated Mar. 1, 2023, 10 Pages.

* cited by examiner

GENERATING SMART REPLIES INVOLVING IMAGE FILES

TECHNICAL FIELD

The present application relates generally to systems, methods, and computer program products for generating smart replies involving image files.

BACKGROUND

Generating suggested replies to messages can drain electronic resources by placing a heavy load of computational expense on the computer system that is generating the suggested replies. In attempting to provide users with the most relevant and useful suggested replies, the computer system may have to evaluate a vast number of parameters. Additionally, available space on a display screen can be limited, particularly with display screens of mobile devices. Computer systems may waste this importance space on the display screen by displaying an excessive number of irrelevant smart replies. Other technical problems may arise as well.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

Figure 1:
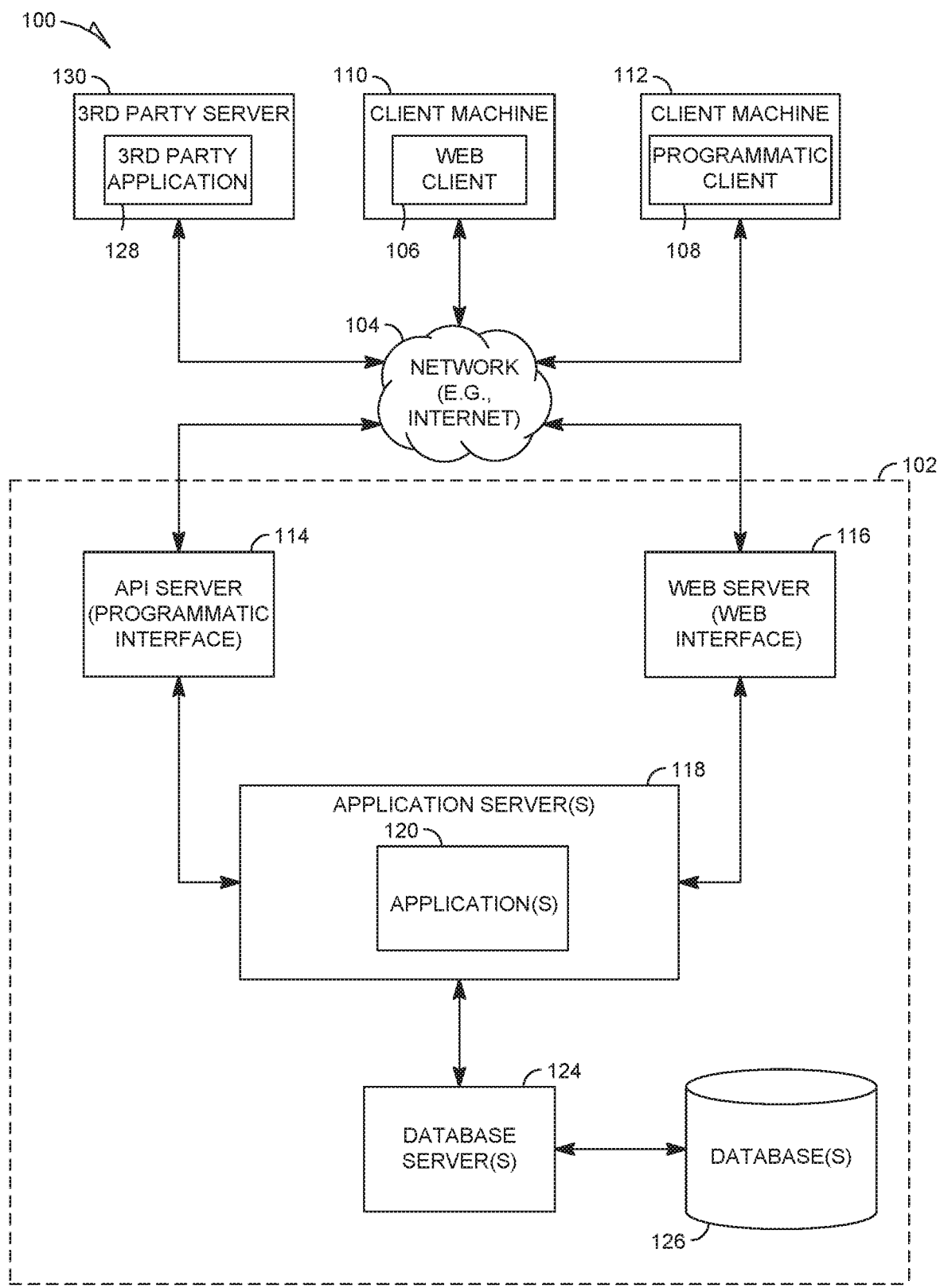
FIG. 1 is a block diagram illustrating a client-server system, in accordance with an example embodiment.

Example methods and systems of generating smart replies involving image files are disclosed. In the following description, for purposes of explanation, numerous specific details are set forth in order to provide a thorough understanding of example embodiments. It will be evident, however, to one skilled in the art that the present embodiments may be practiced without these specific details.

Some or all of the above problems may be addressed by one or more example embodiments disclosed herein. Some technical effects of the system and method of the present disclosure are to provide an improved user interface for providing smart replies involving image files, such as Graphics Interchange Format (GIF) files. Additionally, other technical effects will be apparent from this disclosure as well.

In some example embodiments, operations are performed by a computer system (or other machine) having a memory and at least one hardware processor, with the operations comprising: detecting that a first message comprising a first image file has been transmitted from a first computing device of a first user to a second computing device of a second user; generating a first plurality of smart replies based on a first embedding vector of the first image file, the first embedding vector of the first image file being based on at least one of first textual metadata of the first image file, first image data of the first image file, and a first set of query text used by a first set of users in a first set of searches that resulted in the first image file being included in a first set of transmitted messages; and causing each one of the first plurality of smart replies to be displayed on the second computing device of the second user as a corresponding selectable user interface element.

In some example embodiments, the operations further comprise: receiving a first user selection of one of the first plurality of smart replies from the second computing device; and transmitting a second message including the selected one of the first plurality of smart replies to the first computing device in response to the receiving of the first user selection.

In some example embodiments, each one of the first plurality of smart replies comprises a corresponding text or a corresponding image file.

In some example embodiments, the first image file comprises a static image file or an animated image file. An animated image file, such as an animated GIF file, is a single file that contains within the single file a set of images or frames that are presented in a specified order, whereas a static image file is a single file that contains only a single image or frame. Other types of image files are also within the scope of the present disclosure.

In some example embodiments, the operations further comprise: detecting that a second message has been transmitted from the first computing device to the second computing device; generating a second plurality of smart replies including a second image file based on the second message and a second embedding vector of the second image file, the second embedding vector of the second image file being based on at least one of second textual metadata of the second image file, second image data of the second image file, and second query text used by a second set of users in a second set of searches that resulted in the second image file being included in a second set of transmitted messages; and causing each one of the second plurality of smart replies to be displayed on the second computing device of the second user as a corresponding selectable user interface element. In some example embodiments, the operations further comprise: receiving a second user selection of one of the second plurality of smart replies from the second computing device; and transmitting a third message including the selected one of the second plurality of smart replies to the first computing device in response to the receiving of the second user selection. In some example embodiments, the second message comprises at least one of text or a third image file. In some example embodiments, the second image file comprises a GIF file.

In some example embodiments, the first embedding vector of the first image file is based on the first textual metadata of the first image file. In some example embodiments, the first embedding vector of the first image file is based on the first image data of the first image file. In some example embodiments, the first embedding vector of the first image file is based on a first set of query text used by the first set of users in the first set of searches that resulted in the first image file being included in the first set of transmitted messages.

In some example embodiments, the operations further comprise: receiving first query text included in the first message transmitted from the first computing device to the second computing device, wherein the first query text has been used by the first user in a first search that resulted in the first image file being included in the first message transmitted from the first computing device to the second computing device, and wherein one of the corresponding user interface elements of the first plurality of smart replies is configured to trigger an image file search using the first query text as a search query for the search.

In some example embodiments, the operations further comprise: generating a search query based on the first embedding vector of the first image file, wherein one of the corresponding user interface elements of the first plurality of smart replies is configured to trigger an image file search using the generated search query for the search; receiving a user selection of the one of the corresponding user interface elements; performing the image file search using the generated search query for the search in response to the user selection of the one of the corresponding user interface elements; generating search results including a plurality of image files based on the search; and causing the search results including the plurality of image files to be displayed on the second computing device, wherein each one of the plurality of image files is displayed as a corresponding selectable user interface element configured to transmitting a second message including the selected one of the plurality of image files to the first computing device in response to a user selection of the corresponding selectable user interface element of the selected one of the plurality of image files.

In some example embodiments, the operations further comprise: receiving a plurality of conversations between other users, where each one of the conversations includes the first image file and corresponding textual data displayed in association with the first image file as part of the conversation; and generating the first embedding vector of the first image file based on the first image file and the corresponding textual data of the plurality of conversations.

In some example embodiments, the computer system comprises a remote server. In some example embodiments, the computer system comprises the second computing device.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
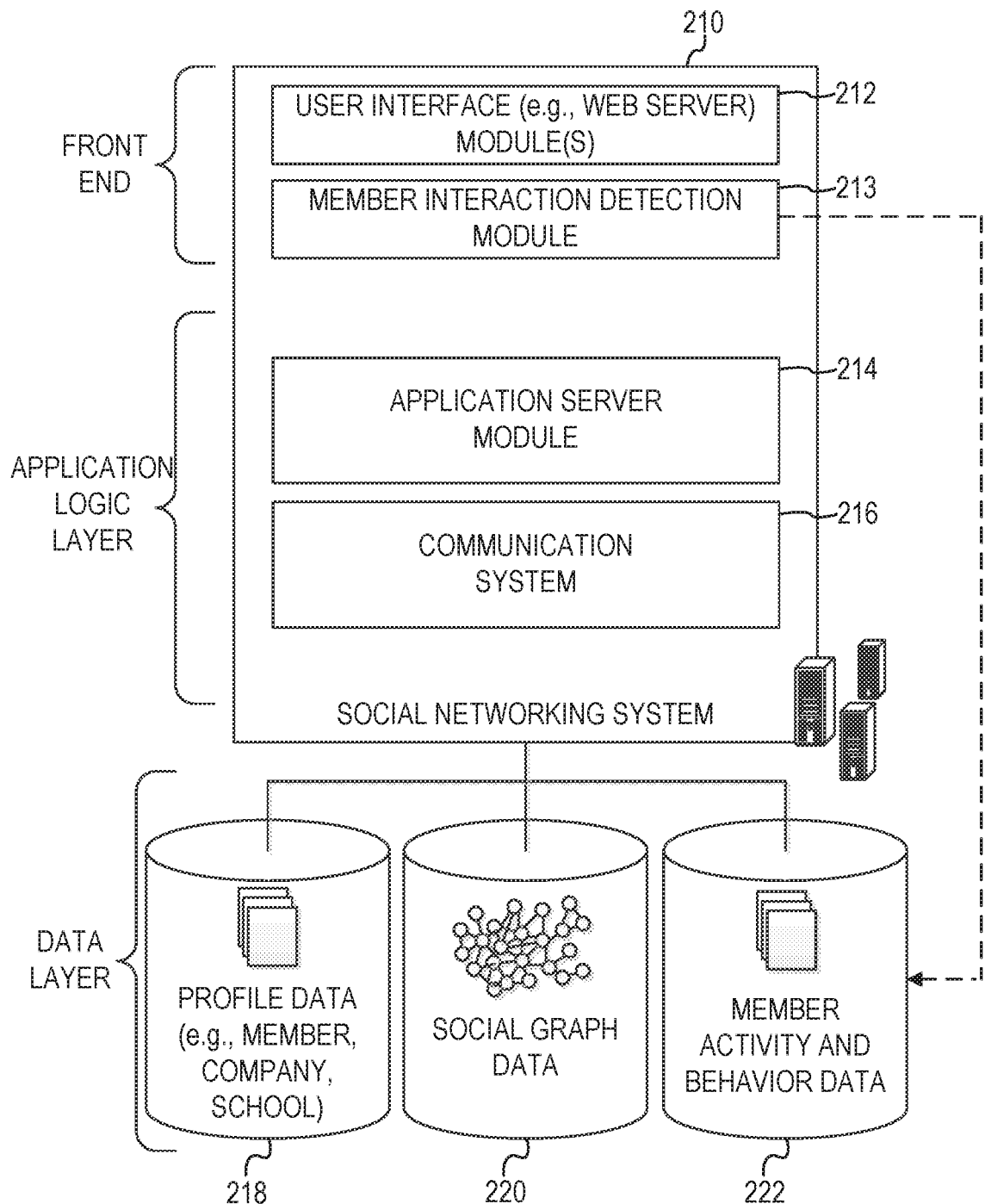
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as a communication system 216, for use in social networking system 210, consistent with some embodiments of the present disclosure. In some embodiments, the communication system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the communication system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile. Additionally, one or more profile images (e.g., photos of the member) may be stored in the database 218.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222. This logged activity information may then be used by the communication system 216. The members' interactions and behavior may also be tracked, stored, and used by a pre-fetch system 400 residing on a client device, such as within a browser of the client device, as will be discussed in further detail below.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the communication system 216 is referred to herein as being used in the context of a social networking service, it is contemplated that it may also be employed in the context of any website or online services. Additionally, features of the present disclosure can be used or presented in the context of a web page or any other user interface view, including, but not limited to, a user interface on a mobile device or on desktop software.

In some example embodiments, the communication system 216 is configured to generate a set of smart replies to a message that includes an image file or a set of smart replies that includes an image file. A smart reply is a suggested reply that is automatically generated by the communication system 216 and presented to a user in response to, or otherwise based on, a message sent to the user from another user (e.g., a text message transmitted from a first device of a first user to a second device of a second user).

Figure 3:
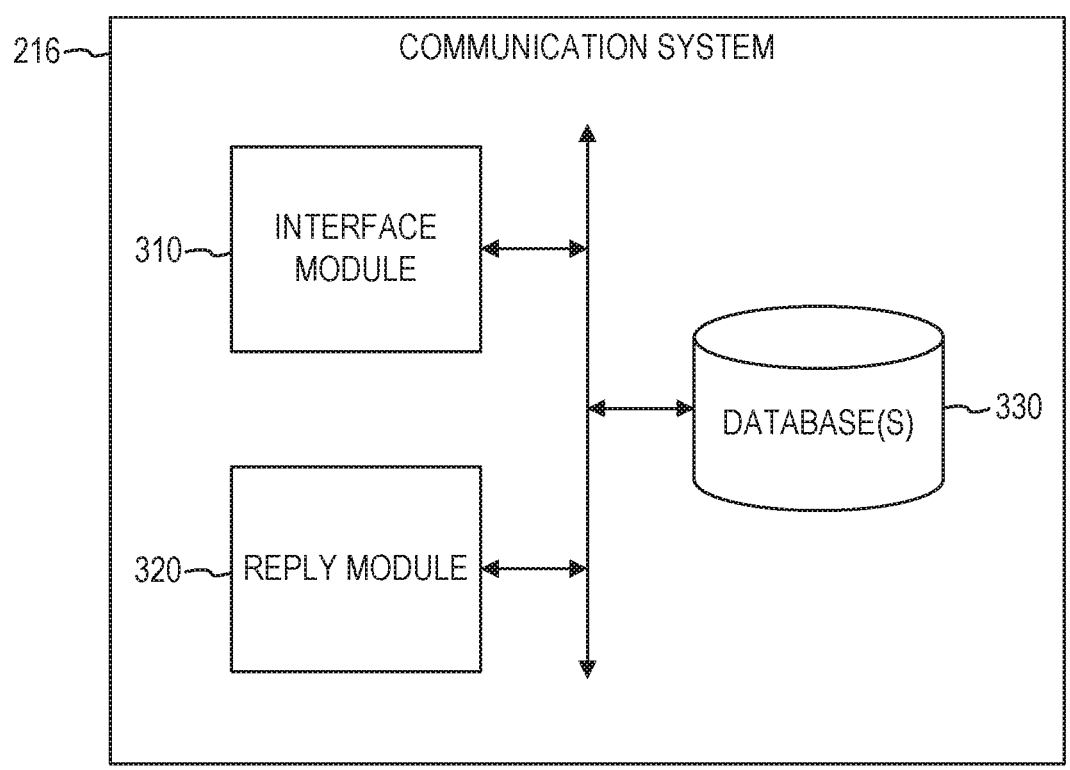
FIG. 3 is a block diagram illustrating a communication system, in accordance with an example embodiment.

FIG. 3 is a block diagram illustrating the communication system 216, in accordance with an example embodiment. In some example embodiments, the communication system 216 comprises any combination of one or more of an interface module 610, a reply module 620, and one or more databases 630. The modules 610 and 620 and the database(s) 330 can reside on a computer system, or other machine, having a memory and at least one processor (not shown).

In some example embodiments, the communication system 216 comprises a remote server. For example, in some embodiments, the modules 610 and 620 and the database(s) 330 are incorporated into the application server(s) 118 in FIG. 1, and the database(s) 330 is incorporated into database(s) 126 in FIG. 1 and can include any combination of one or more of databases 218, 220, and 222 in FIG. 2. In some example embodiments, the communication system 216 comprises a client computing device. For example, in some embodiments, any combination of one or more of the modules 610 and 620 and the database(s) 330 are incorporated into one or more of the client machines 110 and 112 in FIG. 1 or the mobile device 300 in FIG. 3. It is contemplated that other configurations of the modules 610 and 620, as well as the database(s) 630, are also within the scope of the present disclosure.

In some example embodiments, one or more of the modules 610 and 620 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the modules 610 and 620 is configured to receive user input. For example, one or more of the modules 610 and 620 can present one or more GUI elements (e.g., drop-down menu, selectable buttons, text field) with which a user can submit input.

In some example embodiments, one or more of the modules 610 and 620 is configured to perform various communication functions to facilitate the functionality described herein, such as by communicating with the social networking system 210 via the network 104 using a wired or wireless connection. Any combination of one or more of the modules 610 and 620 may also provide various web services or functions, such as retrieving information from the third party servers 130 and the social networking system 210. Information retrieved by the any of the modules 610 and 620 may include profile data corresponding to users and members of the social networking service of the social networking system 210.

Additionally, any combination of one or more of the modules 610 and 620 can provide various data functionality, such as exchanging information with the database(s) 630. For example, any of the modules 610 and 620 can access profile data, social graph data, and member activity and behavior data from the databases 218, 220, and 222 in FIG. 2, as well as exchange information with third party servers 130, client machines 110, 112, and other sources of information.

The communication system 216 is configured to perform a variety of functions involving smart replies and image files (e.g., GIF files). In some example embodiments, the communication system 216 is configured to generate and present a plurality of smart replies comprising content (e.g., text, image file) in response to, or otherwise based on, a transmitted message comprising an image file being detected. In some example embodiments, the communication system 216 is configured to generate and present a plurality of smart replies comprising at least one image file in response to, or otherwise based on, a transmitted message comprising content (e.g., text, image file) being detected. In some example embodiments, the communication system 216 is configured to generate and present an image file search smart reply in response to, or otherwise based on, a transmitted message comprising content (e.g., text, image file) being detected, wherein the image file search smart reply is configured to trigger a process flow that enables the recipient user to select an image file from among a plurality of image files to include as part of the reply message, such as by triggering a search for image files. In some example embodiments, the communication system 216 is configured to learn and generate embedding vectors for image files, and then use the embedding vectors for image files in generating the smart replies disclosed herein. In some example embodiments, the communication system 216 is configured to learn and generate an embedding vector for an image file based on a history of messaging conversations that include the image file and textual data surrounding or otherwise associated with the image file in the same conversation. In some example embodiments, the communication module 216 implements any combination of these functions and the example embodiments disclosed herein.

In some example embodiments, the interface module 610 is configured to detect that a set of one or more messages having content has been transmitted from a first computing device of a first user to a second computing device of a second user. The message may be detected in the context or environment of a messaging application on a mobile device. However, other contexts and environments for the message are also within the scope of the present disclosure.

In some example embodiments, the detected message comprises an image file, and the reply module 320 is configured to select, or otherwise generate, a plurality of smart replies based on an embedding vector of the image file in the image. The embedding vector of the image file may be generated based on at least one of textual metadata of the image file, image data of the image file, and a set of query text used by a set of users in a set of searches that resulted in the image file being included in a set of transmitted messages. The embedding vector and its generation will be discussed in further detail below with respect to FIG. 10.

In some example embodiments, the interface module 310 is configured to cause each one of the generated plurality of smart replies to be displayed on the second computing device of the second user as a corresponding selectable user interface element. In some example embodiments, the reply module 320 is configured to receive a user selection of one of the displayed plurality of smart replies from the second computing device, and then transmit a reply message including the selected one of the plurality of smart replies to the first computing device in response to, or otherwise based on, the receiving of the user selection. In some example embodiments, the reply module 320 is configured to receive a user selection of one of the displayed plurality of smart replies from the second computing device, and then insert the selected one of the plurality of smart replies into a content entry field displayed on the second computing device in response to, or otherwise based on, the receiving of the user selection.

Figure 4:
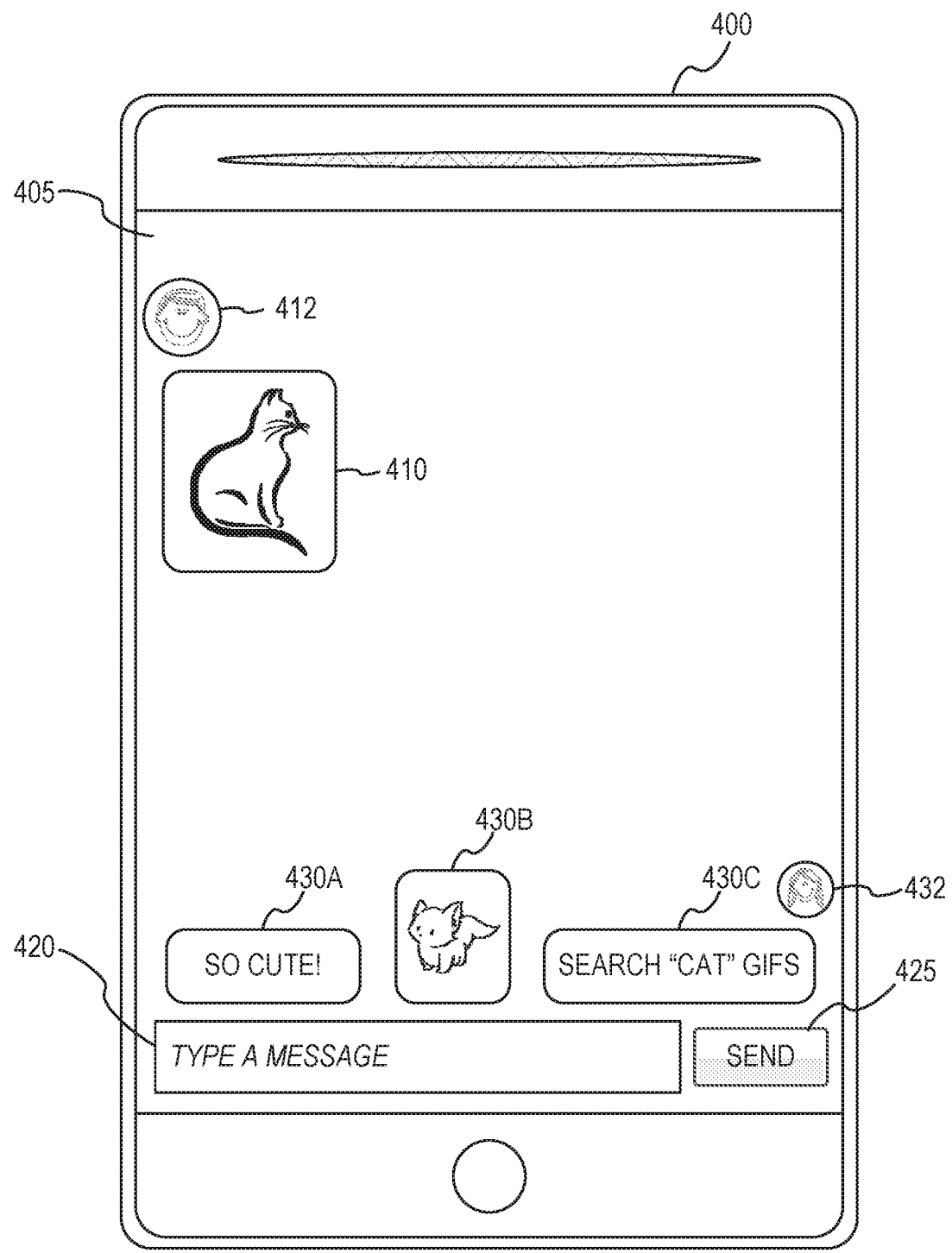
FIG. 4 illustrates generated smart replies being displayed as selectable options for replying to a message comprising an image file within a graphical user interface (GUI) on a display screen of a mobile device, in accordance with an example embodiment.

FIG. 4 illustrates generated smart replies 430 being displayed as selectable options for replying to a message 410 comprising an image file within a GUI on a display screen 405 of a mobile device 400, in accordance with an example embodiment. In FIG. 4, a first user, represented on the display screen 405 by icon 412 (e.g., a profile image of the first user), has sent a message 410 to a second user, represented in the display screen 405 by icon 432 (e.g., a profile image of the second user). The GUI provides a content entry field 420 configured to receive user-entered content (e.g., text, image) to be included in a reply message to the first user. The GUI also provides a selectable user interface element 425 configured to trigger the transmission of the input received via the content entry field 420 to the first user.

Figure 5:
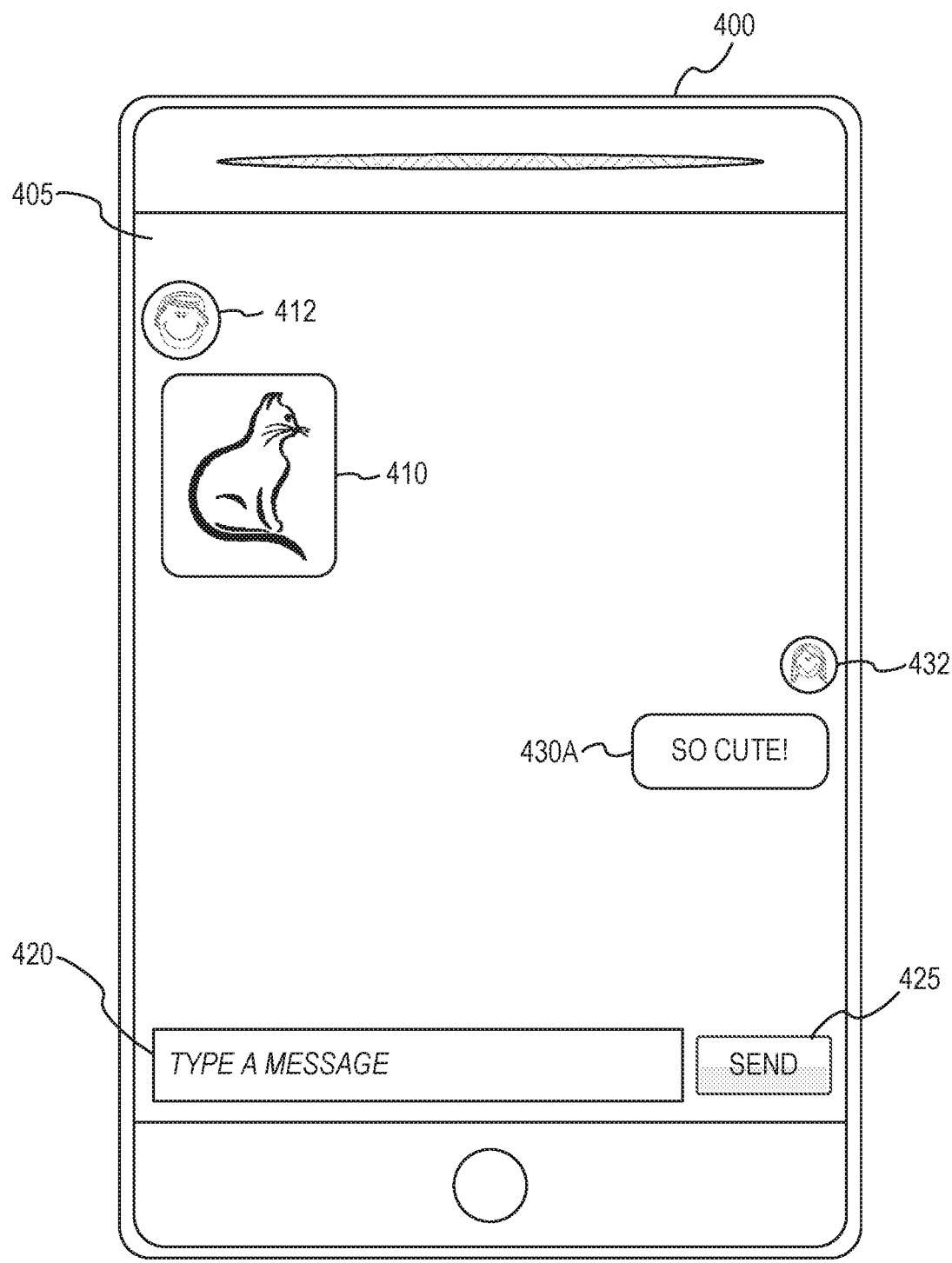
FIG. 5 illustrates a result of a text-based smart reply being selected, in accordance with an example embodiment.

In FIG. 4, the communication system 216 has generated smart replies 430A, 430B, and 430C based on the content of the message 410. In some example embodiments, the smart replies 430A, 430B, and 430C are each displayed as a selectable user interface element that the second user may select to include as part of a reply message to the first user or that the second user may use in selecting an image file to include as part of the reply message. For example, in FIG. 4, the smart reply 430A comprises a text-based smart reply that, in response to or otherwise based on a user selection of the corresponding selectable user interface element of the smart reply 430A, causes the text "SO CUTE!" to be included in a reply message that is transmitted from the second computing device to the first computing device. FIG. 5 illustrates a result of the text-based smart reply 430A being selected, in accordance with an example embodiment. In FIG. 5, the second user has selected (e.g., clicked on, tapped) the corresponding selectable user interface element of the smart reply 430A in FIG. 4. In response to this user selection of the corresponding selectable user interface element of smart reply 430A, the communication system 216 has transmitted a reply message including the selected smart reply 430A to the computing device of the first user, as shown by the smart reply 430A being displayed as part of a conversation between the first user and the second user within the GUI on the display screen 405.

Figure 6:
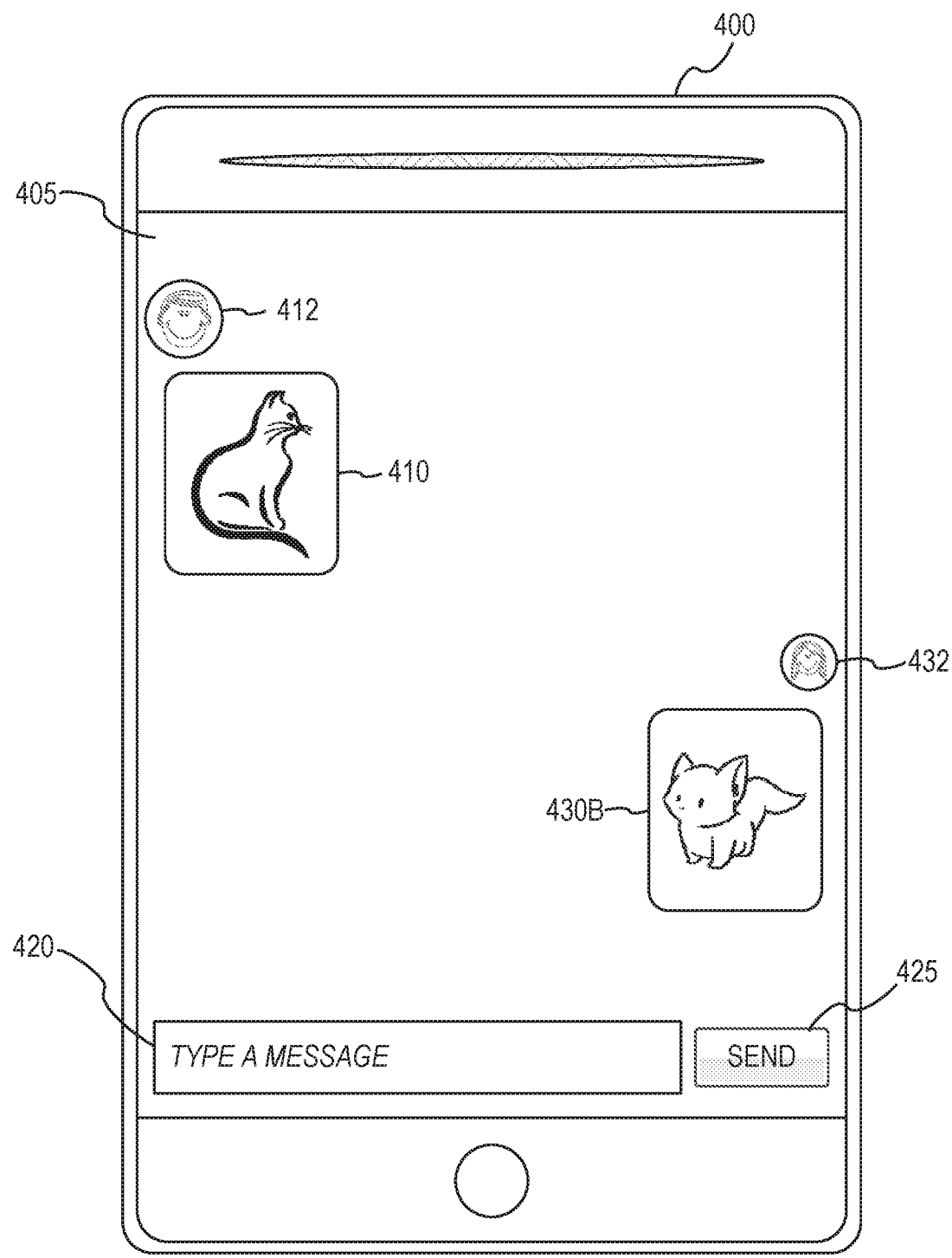
FIG. 6 illustrates a result of an image-based smart reply being selected, in accordance with an example embodiment.

In FIG. 4, the smart reply 430B comprises an image-based smart reply that, in response to or otherwise based on a user selection of the corresponding selectable user interface element of the smart reply 430B, causes the corresponding image file of a cat to be included in a reply message that is transmitted from the second computing device to the first computing device. FIG. 6 illustrates a result of the image-based smart reply 430B being selected, in accordance with an example embodiment. In FIG. 6, the second user has selected (e.g., clicked on, tapped) the corresponding selectable user interface element of the smart reply 430B in FIG. 4. In response to this user selection of the corresponding selectable user interface element of smart reply 430B, the communication system 216 has transmitted a reply message including the selected smart reply 430B to the computing device of the first user, as shown by the smart reply 430B being displayed as part of a conversation between the first user and the second user within the GUI on the display screen 405.

Figure 7:
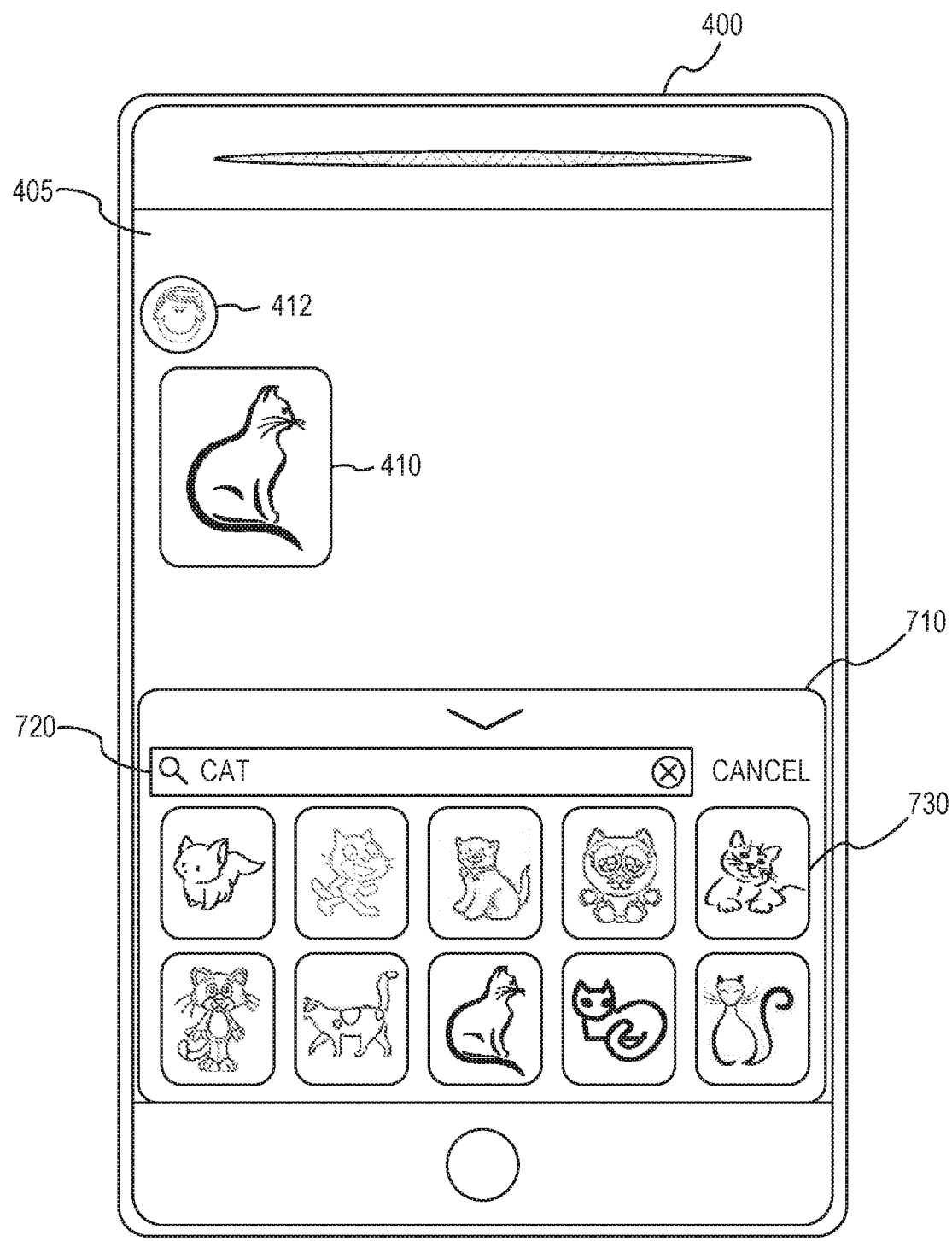
FIG. 7 illustrates a result of an image file search smart reply being selected, in accordance with an example embodiment.

In addition to generating smart replies that, when selected, are included as part of a reply message, in some example embodiments, the reply module 320 generates one or more smart replies that, when selected, trigger a process flow that enables the second user to selecting an image file from among a plurality of image files to include as part of the reply message. For example, such a smart reply may be configured to trigger a search for image files in response to or otherwise based on its selection. FIG. 7 illustrates a result of an image file search smart reply 430C being selected in FIG. 4, in accordance with an example embodiment. In response to or otherwise based on the user selection of the corresponding selectable user interface element of the image file search smart reply 430C, the reply module 320 causes the display of a user interface element 710, such as a panel, in which a search for image files is performed. In some example embodiments, the user interface element 710 comprises a content entry field 720, which may be auto-populated with query text, such as "CAT" in FIG. 7. In some example embodiments, the reply module 320 automatically performs or triggers the performance of an image file search using the query text as a search query for the search. For example, the reply module 320 may search a database of image files to find image files having metadata that matches or is sufficiently relevant to the query text. Such a database of image files may be incorporated into the database(s) 330 in FIG. 3.

Figure 8:
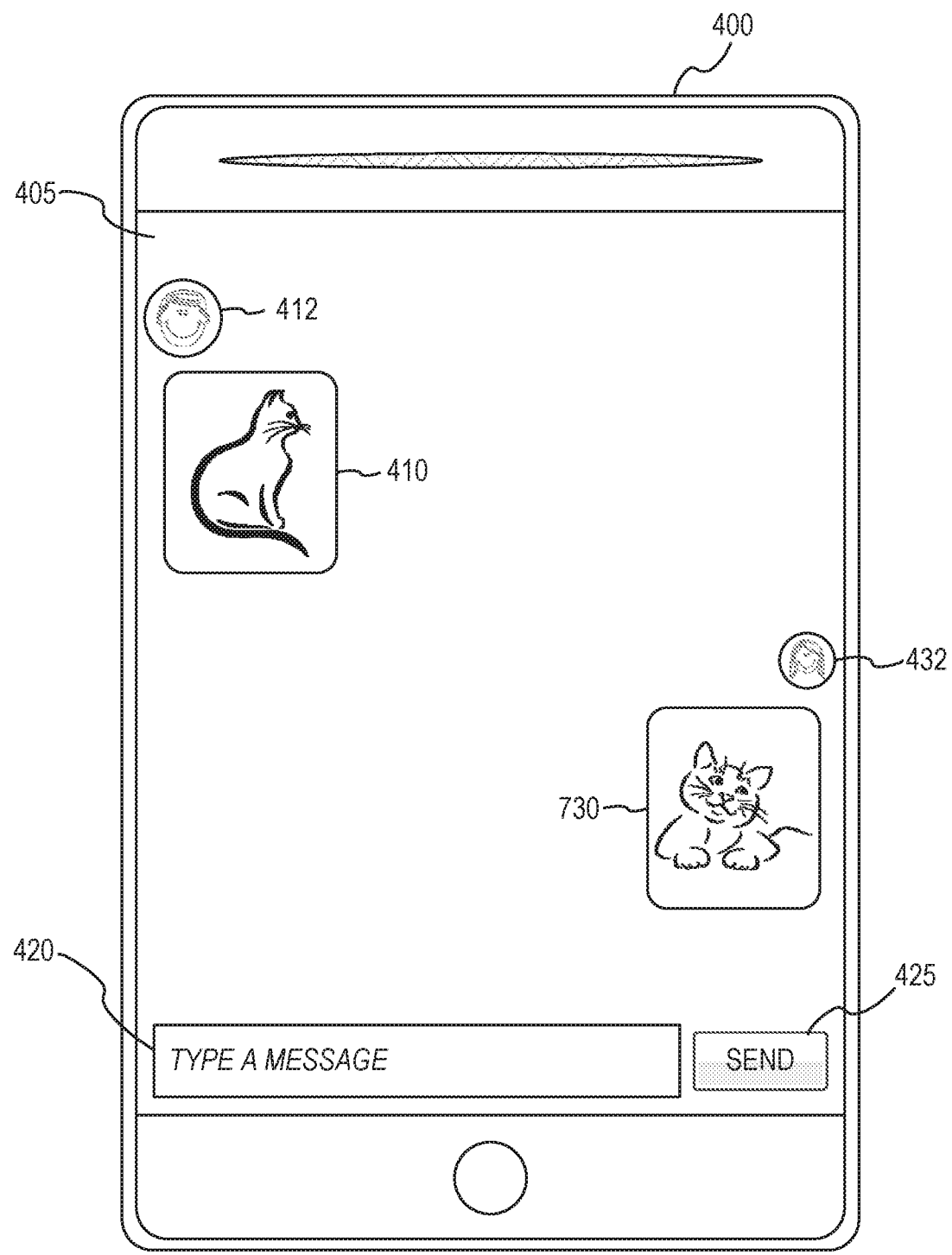
FIG. 8 illustrates a result of an image file in the search results of the image file search being selected, in accordance with an example embodiment.

The reply module 320 generates search results including a plurality of image files 730 based on the search, which are displayed on the second computing device as selectable user interface elements. In some example embodiments, each selectable user interface element corresponding to an image file 730 in the generated search results is configured to transmit a reply message including the selected image file 730 to the first computing device in response to a user selection of the corresponding selectable user interface element of the selected image file 730 from the search results. FIG. 8 illustrates a result of an image file 730 in the search results of the image file search being selected in FIG. 7, in accordance with an example embodiment.

In some example embodiments, the message from the first computing device comprises text or an image file, and the reply module 320 is configured to generate a plurality of smart replies including at least one image file based on the message and an embedding vector of the image file(s). Each one of the generated smart replies is then displayed on the second computing device as a corresponding selectable user interface element. In some example embodiments, the image file(s) included in the plurality of smart replies comprise a GIF file. However, other types of image files are also within the scope of the present disclosure.

Figure 9:
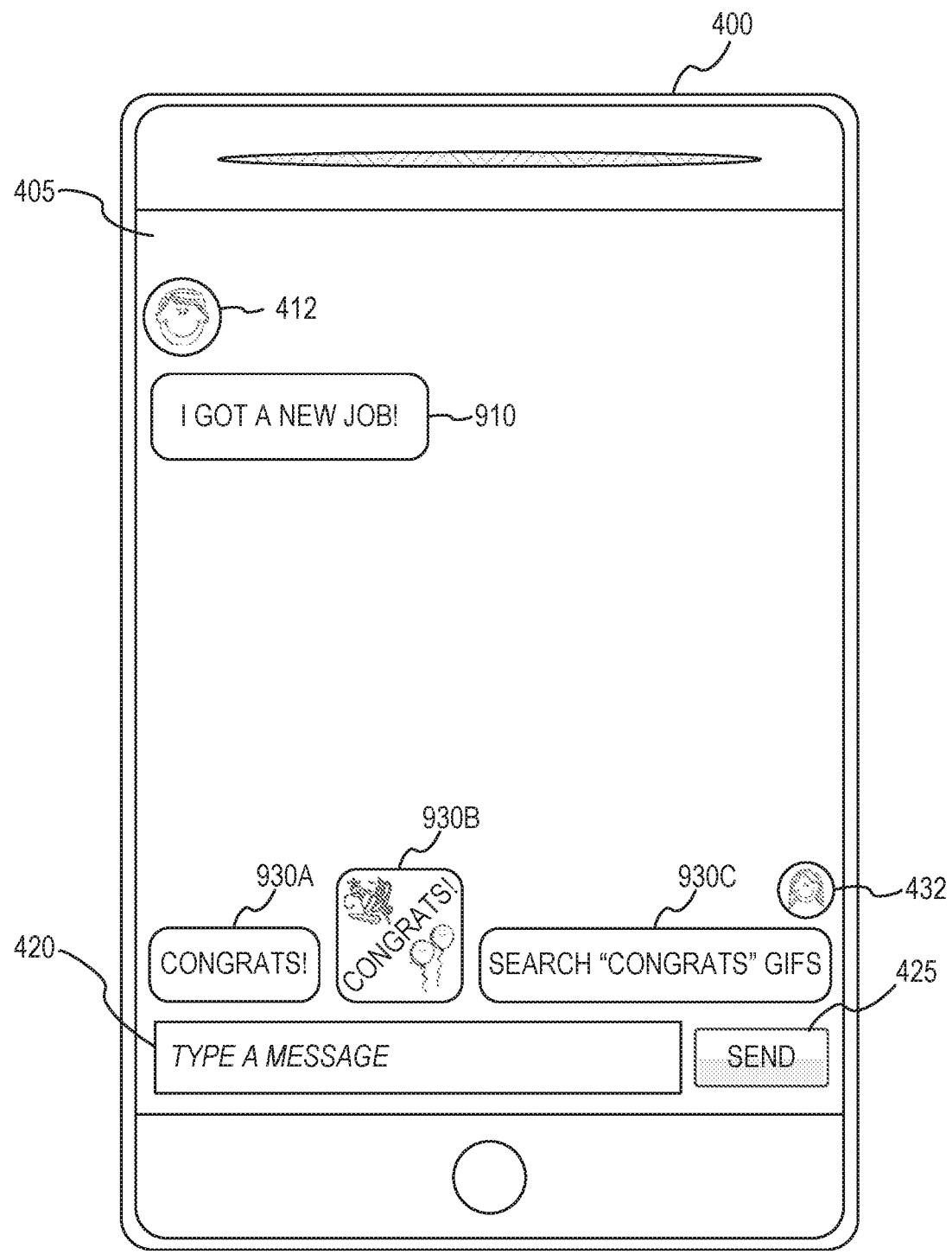
FIG. 9 illustrates generated smart replies being displayed as selectable options for replying to a message comprising text within a GUI on a display screen of a mobile device, in accordance with an example embodiment.

FIG. 9 illustrates generated smart replies 930 being displayed as selectable options for replying to a message 910 comprising text within the GUI on the display screen 405 of the mobile device 300, in accordance with an example embodiment. In FIG. 9, a first user, represented on the display screen 405 by icon 412 (e.g., a profile image of the first user), has sent the message 910 to a second user, represented in the display screen 405 by icon 432 (e.g., a profile image of the second user). In FIG. 9, the reply module 320 has generated smart replies 930A, 930B, and 930C based on the text-based content of the message 910. In some example embodiments, the smart replies 930A, 930B, and 930C are each displayed as a selectable user interface element that the second user may select to include as part of a reply message to the first user or that the second user may use in selecting an image file to include as part of the reply message. In FIG. 9, the smart reply 930A comprises a text-based smart reply having the same function(s) as the text-based smart reply 430A in FIG. 4, the smart reply 930B comprises an image-based smart reply having the same function(s) as the image-based smart reply 430B in FIG. 4, and the smart reply 930C comprises an image file search smart reply having the same function(s) as the image file search smart reply 430C in FIG. 4. However, unlike the example discussed above with respect to the image file search smart reply 430C in which the image file search smart reply 430C and its resulting images file search results are generated based on query text that is transmitted along with the image file of the message 410 (e.g., the query text is transmitted as metadata of the message 410), in some example embodiments, such as the example shown in FIG. 9, the reply module 320 generates the image file search smart reply 930C and its resulting images file search results based on an embedded vector of the content of the message 910 and corresponding embedded vectors of the image files in the search results.

It is contemplated that the communication system 216 can generated and display any configuration of text-based smart replies 430A, image-based smart replies 430B, and image file search smart replies 430C. For example, the plurality of smart replies 430 generate and displayed by the communication system 216 may vary, depending on the situation, between all text-based smart replies 430A, all image-based smart replies 430B, all image file search smart replies 430C, and any combination of one or more of text-based smart replies 430A, image-based smart replies 430B, and image file search smart replies 430C.

Figure 10:
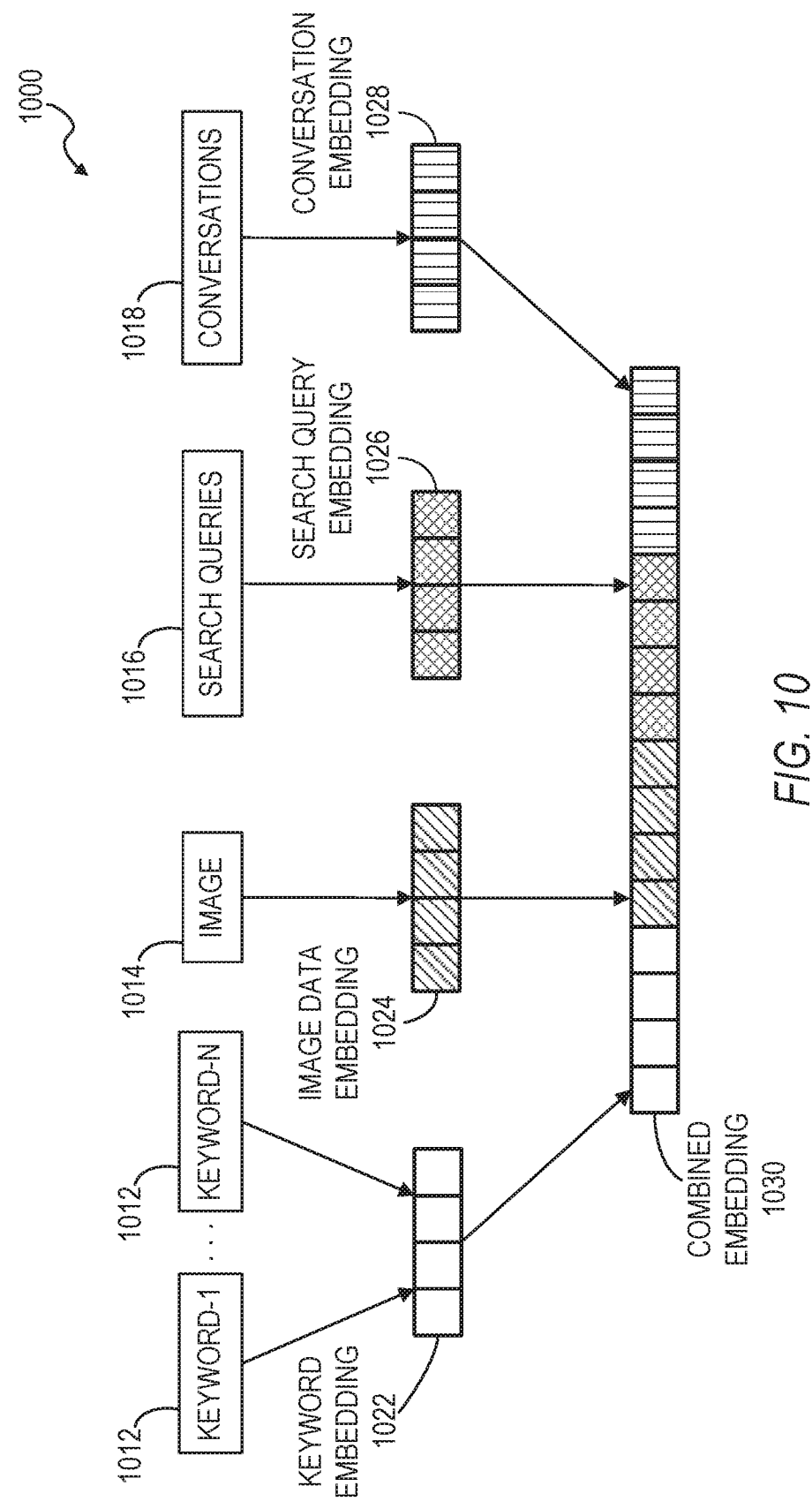
FIG. 10 illustrates a flow of different types of data associated with an image file being used to generate an embedding vector for the image file, in accordance with an example embodiment.

FIG. 10 illustrates a flow 1000 of different types of data associated with an image file being used to generate an embedding vector for the image file, in accordance with an example embodiment. In FIG. 10, an image file has any combination of one or more of the following attributes: one or more keywords 1012 associated with the image file as textual metadata of the image file (e.g., the keyword "cat" as textual metadata of an image file of a cat), image data 1014, search queries 1016 comprising query text used by users in searches that resulted in the image file being included in transmitted messages, and a history of conversations 1018 including the image file and corresponding textual data displayed in association with the image file as part of the conversation.

In some example embodiments, the reply module 320 generates a keyword embedding vector 1022 based on the keyword(s) 1012. The reply module 320 may use a neural network to generate a corresponding embedding vector for each keyword 1012, and then generate a single keyword embedding vector 1022 from all of the embedding vectors of the keywords 1012.

In some example embodiments, the reply module 320 generates an image data embedding vector 1024 based on the image data 1014. The reply module 320 may perform one or more computer vision operations on the image data 1014 to generate the image data embedding vector 1024 or feed the pixels of the image data 1014 into a neural network to generate the image data embedding vector.

In some example embodiments, the reply module 320 generates a search query embedding vector 1026 based on the search queries 1016. The reply module 320 may use a neural network to generate a corresponding embedding vector for each search query 1016, and then generate a single search query embedding vector 1026 from all of the embedding vectors of the search queries 1016. In some example embodiments, each search query comprises query text used by a user in a search that resulted in the image file being included in a transmitted message, such as in a scenario where the user enters the search query "cat" into a search field, and a search for images files corresponding to the entered search query "cat" is performed, resulting in search results including image files, where the image file is selected by the user for inclusion in a message to be transmitted to another user.

In some example embodiments, the reply module 320 generates a conversation embedding vector 1028 based on the history of conversations 1018. The reply module 320 may use a neural network to generate a corresponding embedding vector for conversation 1018, and then generate a single conversation embedding vector 1028 from all of the embedding vectors of the conversations 1018. In some example embodiments, each conversation 1018 comprises the image file and corresponding textual data displayed in association with the image file as part of the conversation 1018. For example, in FIG. 5, the conversation displayed on the display screen 405 of the mobile device 400 includes a message 410 comprising an image file of a cat from a first user and a reply message 430A comprising the text "SO CUTE!" from a second user. Using this example, the image file of the message 410 and the text of the message 430A are input as a single conversation 1018 for use in generating the conversation embedding vector 1028.

In some example embodiments, the reply module 320 generates a combined embedding vector 1030 for the image file based on any combination of one or more of the keyword embedding vector 1022, the image data embedding vector 1024, the search query embedding vector 1026, and the conversation embedding vector 1028. In some example embodiments, one or more sequence-to-sequence models are used to generated the embedding vectors. However, other types of models may additionally or alternatively be used to generate the embedding vectors.

Figure 11:
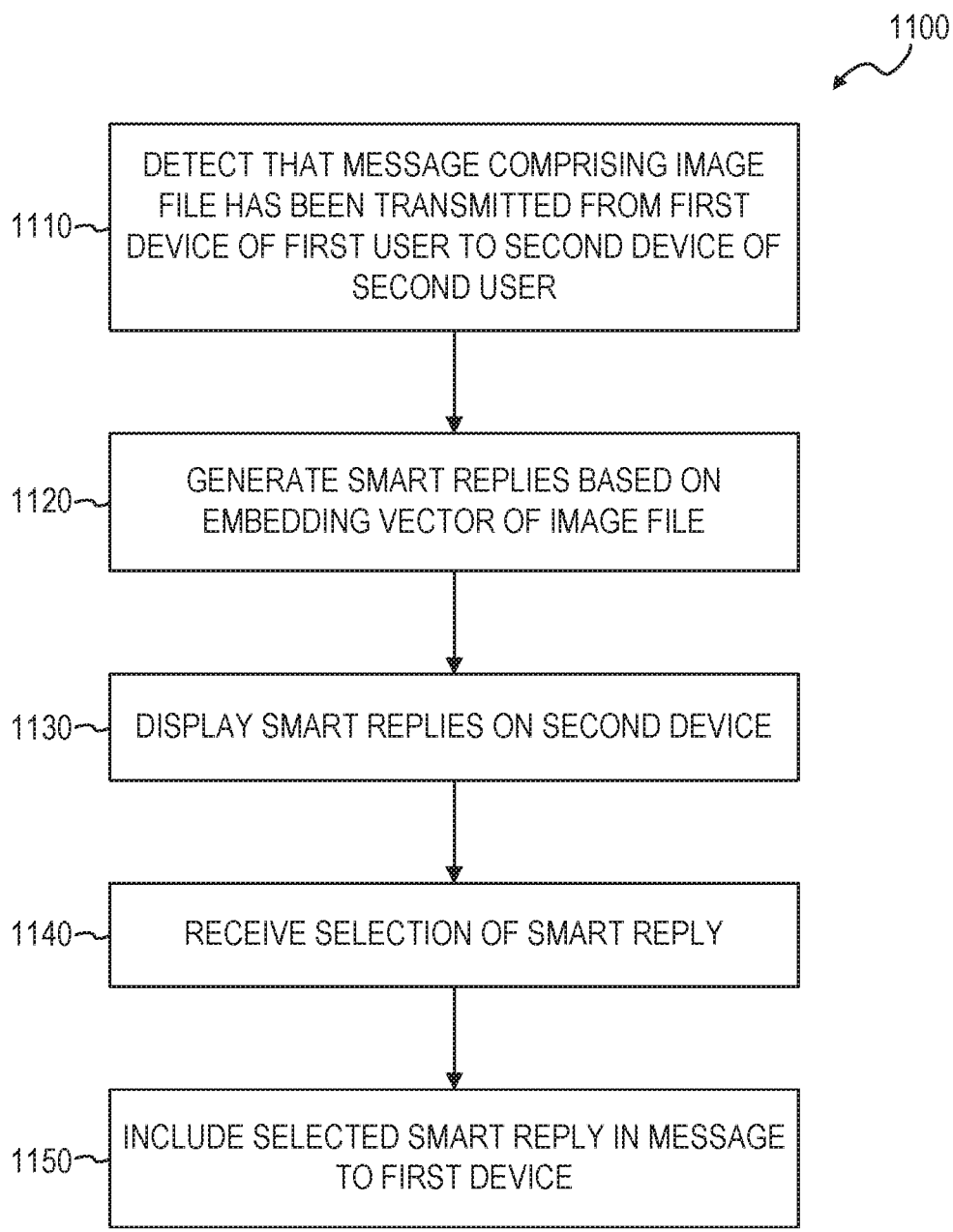
FIG. 11 is a flowchart illustrating a method of generating smart replies to a message comprising an image file, in accordance with an example embodiment.

FIG. 11 is a flowchart illustrating a method 1100 of generating smart replies to a message comprising an image file, in accordance with an example embodiment. The method 1100 can be performed by processing logic that can comprise hardware (e.g., circuitry, dedicated logic, programmable logic, microcode, etc.), software (e.g., instructions run on a processing device), or a combination thereof. In one implementation, the method 1100 is performed by the communication system 216 of FIGS. 2-3, as described above.

At operation 1110, the communication system 216 detects that a first message comprising a first image file has been transmitted from a first computing device of a first user to a second computing device of a second user. At operation 1120, the communication system 216 generates a first plurality of smart replies based on a first embedding vector of the first image file. In some example embodiments, the first embedding vector of the first image file is based on at least one of first textual metadata of the first image file, first image data of the first image file, and a first set of query text used by a first set of users in a first set of searches that resulted in the first image file being included in a first set of transmitted messages. At operation 1130, the communication system 216 causes each one of the first plurality of smart replies to be displayed on the second computing device of the second user as a corresponding selectable user interface element. At operation 1140, the communication system 216 receives a first user selection of one of the first plurality of smart replies from the second computing device. At operation 1150, the communication system 216 transmits a second message including the selected one of the first plurality of smart replies to the first computing device in response to the receiving of the first user selection.

It is contemplated that any of the other features described within the present disclosure can be incorporated into the method 1100.

Figure 12:
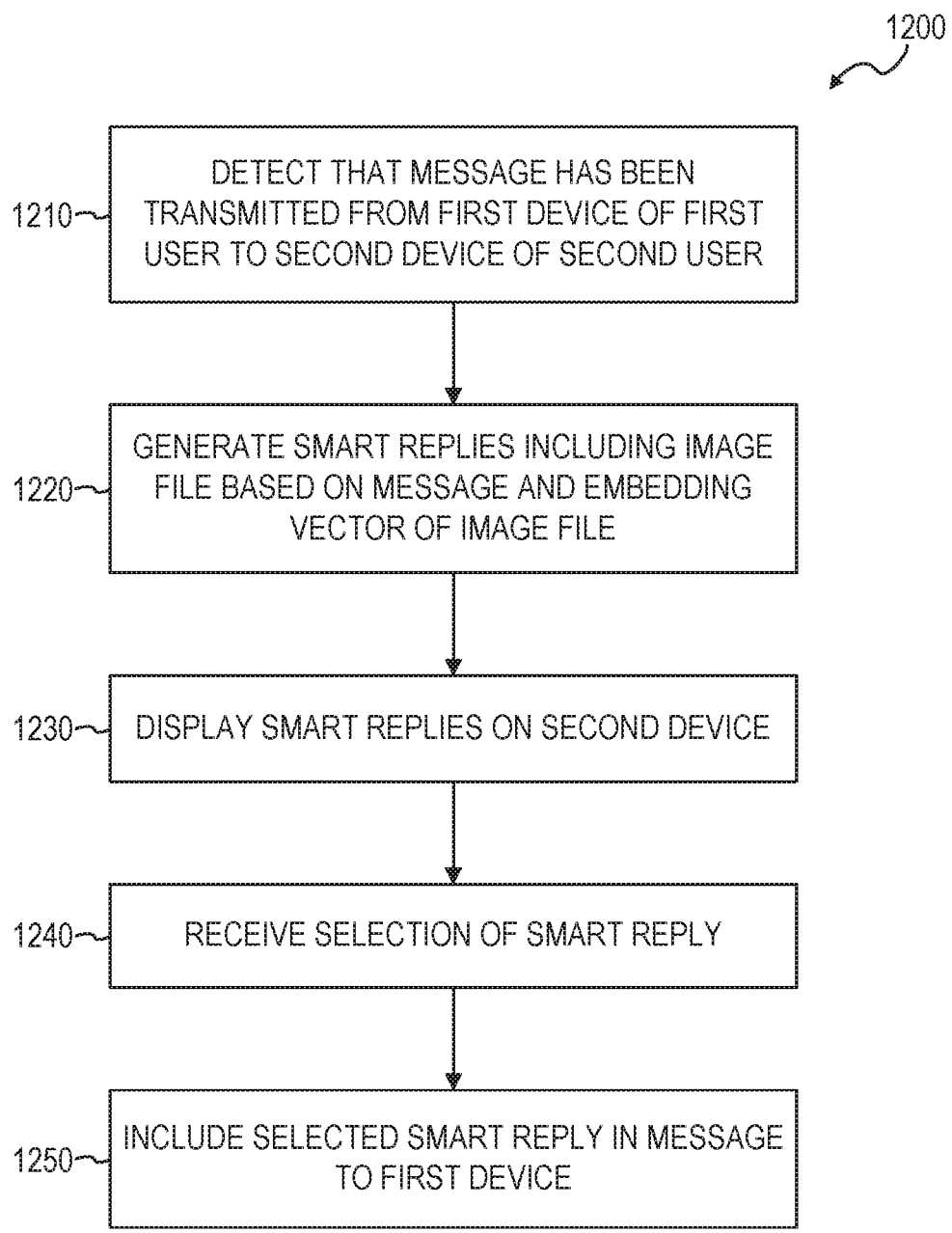
FIG. 12 is a flowchart illustrating a method of generating smart replies comprising an image file, in accordance with an example embodiment.

FIG. 12 is a flowchart illustrating a method 1200 of generating smart replies comprising an image file, in accordance with an example embodiment. The method 1200 can be performed by processing logic that can comprise hardware (e.g., circuitry, dedicated logic, programmable logic, microcode, etc.), software (e.g., instructions run on a processing device), or a combination thereof. In one implementation, the method 1200 is performed by the communication system 216 of FIGS. 2-3, as described above.

At operation 1210, the communication system 216 detects that a second message has been transmitted from the first computing device to the second computing device. At operation 1220, the communication system 216 generates a second plurality of smart replies including a second image file, as well as one or more other image files, based on the second message and a second embedding vector of the second image file. In some example embodiments, the second embedding vector of the second image file is based on at least one of second textual metadata of the second image file, second image data of the second image file, and second query text used by a second set of users in a second set of searches that resulted in the second image file being included in a second set of transmitted messages. At operation 1230, the communication system 216 causes each one of the second plurality of smart replies to be displayed on the second computing device of the second user as a corresponding selectable user interface element. At operation 1240, the communication system 216 receives a second user selection of one of the second plurality of smart replies from the second computing device. At operation 1250, the communication system 216 transmits a third message including the selected one of the second plurality of smart replies to the first computing device in response to the receiving of the second user selection. In some example embodiments, the second message comprises at least one of text or a third image file. In some example embodiments, the second image file comprises a GIF file.

It is contemplated that any of the other features described within the present disclosure can be incorporated into the method 1200.

Figure 13:
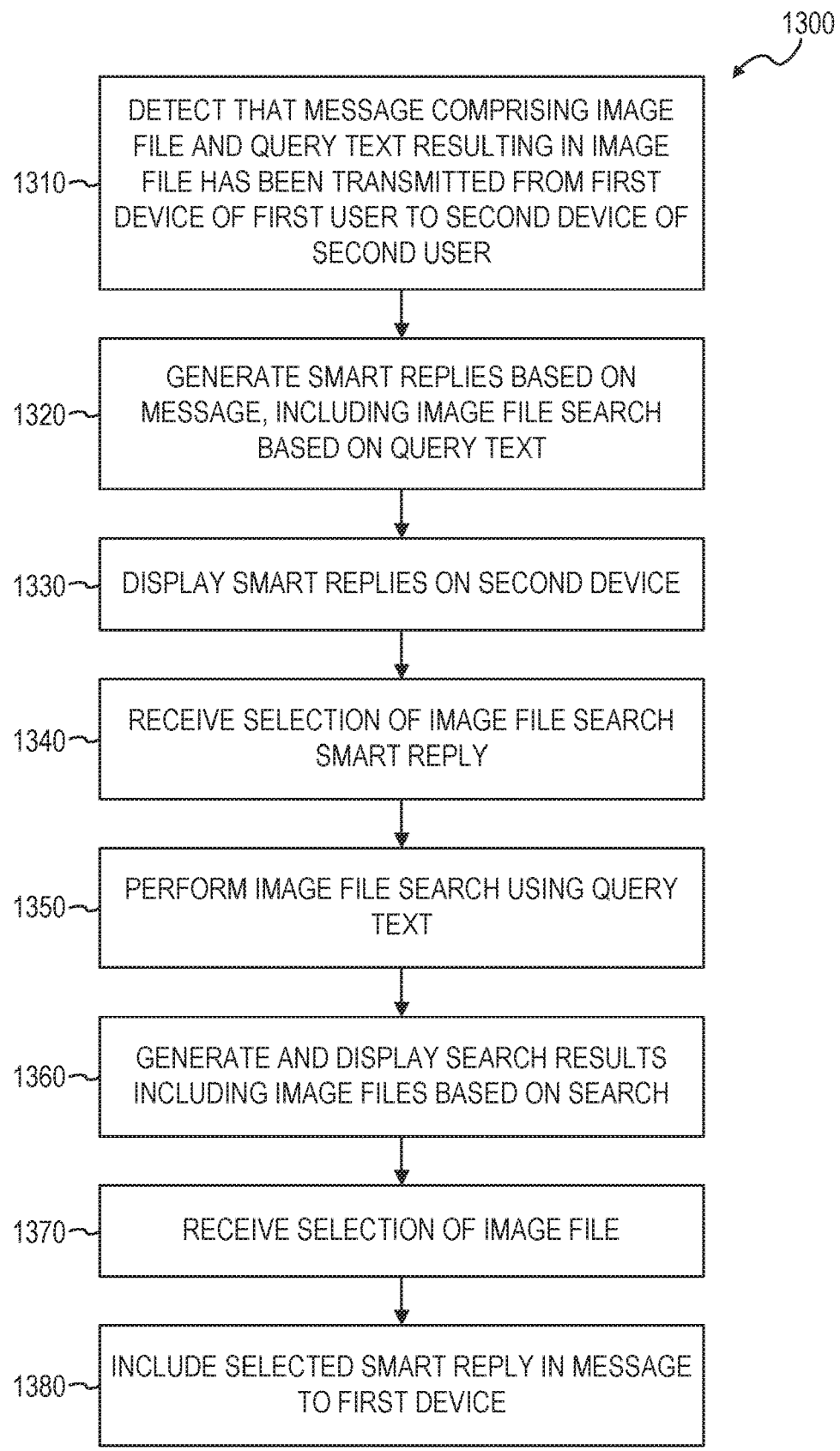
FIG. 13 is a flowchart illustrating a method of generating smart replies comprising an image file search, in accordance with an example embodiment.

FIG. 13 is a flowchart illustrating a method 1300 of generating smart replies comprising an image file search, in accordance with an example embodiment. The method 1300 can be performed by processing logic that can comprise hardware (e.g., circuitry, dedicated logic, programmable logic, microcode, etc.), software (e.g., instructions run on a processing device), or a combination thereof. In one implementation, the method 1300 is performed by the communication system 216 of FIGS. 2-3, as described above.

At operation 1310, the communication system 216 detects that a first message comprising a first image file and first query text has been transmitted from a first computing device of a first user to a second computing device of a second user. In some example embodiments, the first query text has been used by the first user in a first search that resulted in the first image file being included in the first message transmitted from the first computing device to the second computing device.

At operation 1320, the communication system 216 generates a first plurality of smart replies based on the first message. In some example embodiments, the first plurality of smart replies comprises an image file search smart reply that is generated by the communication system 216 based on the first query text of the first message.

At operation 1330, the communication system 216 causes each one of the first plurality of smart replies to be displayed on the second computing device of the second user as a corresponding selectable user interface element. In some example embodiments, the user interface element corresponding to the image file search smart reply is configured to trigger an image file search using the first query text as a search query for the search.

At operation 1340, the communication system 216 receives a first user selection of the image file search smart reply from the second computing device.

At operation 1350, the communication system 216 performs the image file search using the search query for the search in response to the user selection of the one of the corresponding user interface elements.

At operation 1360, the communication system 216 generates search results including a plurality of image files based on the search, and causes the search results including the plurality of image files to be displayed on the second computing device, wherein each one of the plurality of image files is displayed as a corresponding selectable user interface element configured to transmitting a second message including the selected one of the plurality of image files to the first computing device in response to a user selection of the corresponding selectable user interface element of the selected one of the plurality of image files.

At operation 1370, the communication system 216 receives a first user selection of one of the first plurality of smart replies from the second computing device.

At operation 1380, the communication system 216 transmits a second message including the selected one of the first plurality of smart replies to the first computing device in response to the receiving of the first user selection.

It is contemplated that any of the other features described within the present disclosure can be incorporated into the method 1300.

Figure 14:
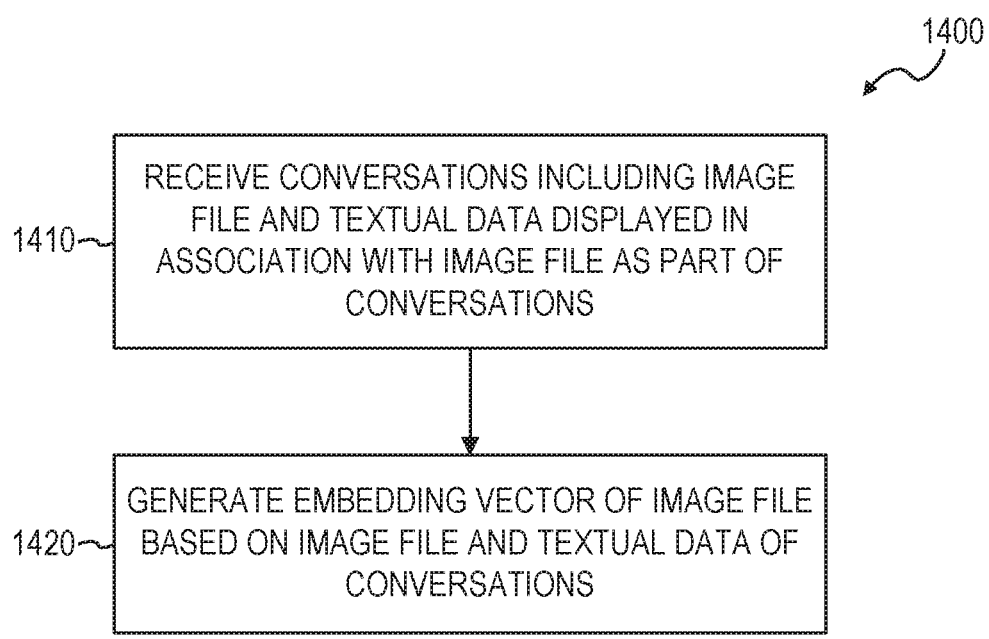
FIG. 14 is a flowchart illustrating a method of generating an embedding for an image file based on conversations comprising messages that included the image file and textual data, in accordance with an example embodiment.

FIG. 14 is a flowchart illustrating a method 1400 of generating an embedding for an image file based on conversations comprising messages that included the image file and textual data, in accordance with an example embodiment. The method 1400 can be performed by processing logic that can comprise hardware (e.g., circuitry, dedicated logic, programmable logic, microcode, etc.), software (e.g., instructions run on a processing device), or a combination thereof. In one implementation, the method 1400 is performed by the communication system 216 of FIGS. 2-3, as described above.

At operation 1410, the communication system 216 receives a plurality of conversations between other users. In some example embodiments, each one of the conversations includes the same image file, as well as corresponding textual data displayed in association with the image file as part of the conversation.

At operation 1420, the communication system 216 generates an embedding vector of the image file based on the image file and the corresponding textual data of the plurality of conversations.

It is contemplated that any of the other features described within the present disclosure can be incorporated into the method 1400.

Example Mobile Device

Figure 15:
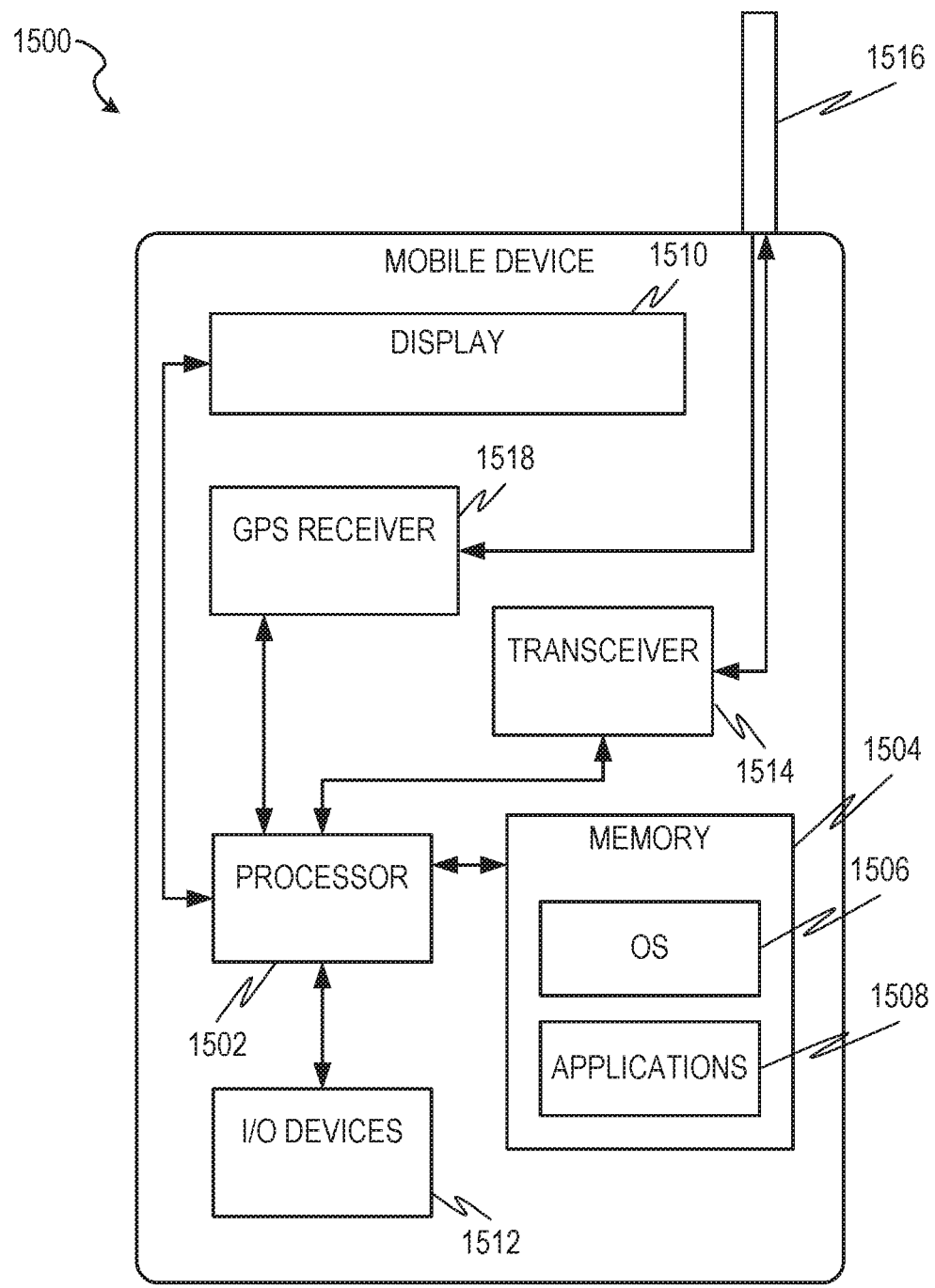
FIG. 15 is a block diagram illustrating a mobile device, in accordance with some example embodiments.

FIG. 15 is a block diagram illustrating a mobile device 1500, according to an example embodiment. The mobile device 1500 can include a processor 1502. The processor 1502 can be any of a variety of different types of commercially available processors suitable for mobile devices 1500 (for example, an XScale architecture microprocessor, a Microprocessor without Interlocked Pipeline Stages (MIPS) architecture processor, or another type of processor). A memory 1504, such as a random access memory (RAM), a Flash memory, or other type of memory, is typically accessible to the processor 1502. The memory 1504 can be adapted to store an operating system (OS) 1506, as well as application programs 1508, such as a mobile location-enabled application that can provide location-based services (LBSs) to a user. The processor 1502 can be coupled, either directly or via appropriate intermediary hardware, to a display 1510 and to one or more input/output (I/O) devices 1512, such as a keypad, a touch panel sensor, a microphone, and the like. Similarly, in some embodiments, the processor 1502 can be coupled to a transceiver 1514 that interfaces with an antenna 1516. The transceiver 1514 can be configured to both transmit and receive cellular network signals, wireless data signals, or other types of signals via the antenna 1516, depending on the nature of the mobile device 1500. Further, in some configurations, a GPS receiver 1518 can also make use of the antenna 1516 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 16:
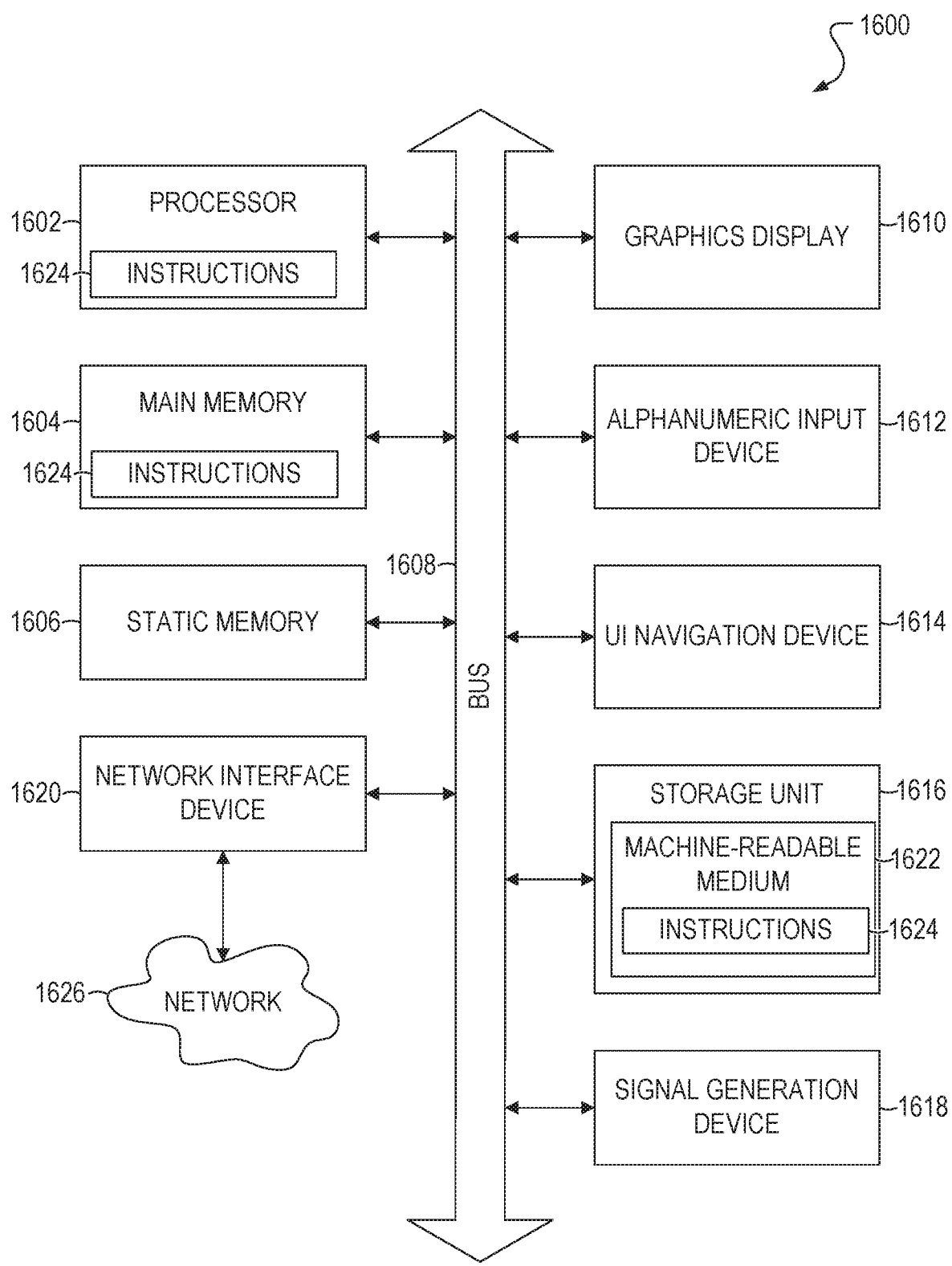
FIG. 16 is a block diagram of an example computer system on which methodologies described herein may be executed, in accordance with an example embodiment.

FIG. 16 is a block diagram of an example computer system 1600 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU), a graphics processing unit (GPU) or both), a main memory 1604 and a static memory 1606, which communicate with each other via a bus 1608. The computer system 1600 may further include a graphics display unit 1610 (e.g., a liquid crystal display (LCD) or a cathode ray tube (CRT)). The computer system 1600 also includes an alphanumeric input device 1612 (e.g., a keyboard or a touch-sensitive display screen), a user interface (UI) navigation device 1614 (e.g., a mouse), a storage unit 1616, a signal generation device 1618 (e.g., a speaker) and a network interface device 1620.

Machine-Readable Medium

The storage unit 1616 includes a machine-readable medium 1622 on which is stored one or more sets of instructions and data structures (e.g., software) 1624 embodying or utilized by any one or more of the methodologies or functions described herein. The instructions 1624 may also reside, completely or at least partially, within the main memory 1604 and/or within the processor 1602 during execution thereof by the computer system 1600, the main memory 1604 and the processor 1602 also constituting machine-readable media.

While the machine-readable medium 1622 is shown in an example embodiment to be a single medium, the term "machine-readable medium" may include a single medium or multiple media (e.g., a centralized or distributed database, and/or associated caches and servers) that store the one or more instructions 1624 or data structures. The term "machine-readable medium" shall also be taken to include any tangible medium that is capable of storing, encoding or carrying instructions (e.g., instructions 1624) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1624 may further be transmitted or received over a communications network 1626 using a transmission medium. The instructions 1624 may be transmitted using the network interface device 1620 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
    detecting, by a computer system comprising a memory and at least one hardware processor, that a first message comprising a first image file has been transmitted from a first computing device of a first user to a second computing device of a second user;
    generating, by the computer system, a first plurality of smart replies based on a first embedding vector of the first image file, the first embedding vector of the first image file being based on a first set of query text used by a first set of users in a first set of searches that resulted in the first image file being included in a first set of transmitted messages, the first set of users comprising at least one other user different from the second user; and
    causing, by the computer system, each one of the first plurality of smart replies to be displayed on the second computing device of the second user as a corresponding selectable user interface element.

2. The computer-implemented method of claim 1, further comprising:
    receiving, by the computer system, a first user selection of one of the first plurality of smart replies from the second computing device; and
    transmitting, by the computer system, a second message including the selected one of the first plurality of smart replies to the first computing device in response to the receiving of the first user selection.

3. The computer-implemented method of claim 1, wherein each one of the first plurality of smart replies comprises a corresponding text or a corresponding image file.

4. The computer-implemented method of claim 1, wherein the first image file comprises a static image file or an animated image file.

5. The computer-implemented method of claim 1, further comprising:
    detecting, by the computer system, that a second message has been transmitted from the first computing device to the second computing device;
    generating, by the computer system, a second plurality of smart replies including a second image file based on the second message and a second embedding vector of the second image file, the second embedding vector of the second image file being based on at least one of second textual metadata of the second image file, second image data of the second image file, and second query text used by a second set of users in a second set of searches that resulted in the second image file being included in a second set of transmitted messages; and
    causing, by the computer system, each one of the second plurality of smart replies to be displayed on the second computing device of the second user as a corresponding selectable user interface element.

6. The computer-implemented method of claim 5, further comprising:
    receiving, by the computer system, a second user selection of one of the second plurality of smart replies from the second computing device; and
    transmitting, by the computer system, a third message including the selected one of the second plurality of smart replies to the first computing device in response to the receiving of the second user selection.

7. The computer-implemented method of claim 6, wherein the second message comprises at least one of text or a third image file.

8. The computer-implemented method of claim 5, wherein the second image file comprises a GIF file.

9. The computer-implemented method of claim 1, wherein the first embedding vector of the first image file is based on the first textual metadata of the first image file.

10. The computer-implemented method of claim 1, wherein the first embedding vector of the first image file is based on the first image data of the first image file.

11. The computer-implemented method of claim 1, further comprising:
    receiving, by the computer system, first query text included in the first message transmitted from the first computing device to the second computing device, the first query text having been used by the first user in a first search that resulted in the first image file being included in the first message transmitted from the first computing device to the second computing device,
    wherein one of the corresponding user interface elements of the first plurality of smart replies is configured to trigger an image file search using the first query text as a search query for the search.

12. The computer-implemented method of claim 1, further comprising:
    generating, by the computer system, a search query based on the first embedding vector of the first image file, wherein one of the corresponding user interface elements of the first plurality of smart replies is configured to trigger an image file search using the generated search query for the search;
    receiving, by the computer system, a user selection of the one of the corresponding user interface elements;
    performing, by the computer system, the image file search using the generated search query for the search in response to the user selection of the one of the corresponding user interface elements;
generating, by the computer system, search results including a plurality of image files based on the search; and
causing, by the computer system, the search results including the plurality of image files to be displayed on the second computing device, each one of the plurality of image files being displayed as a corresponding selectable user interface element configured to transmitting a second message including the selected one of the plurality of image files to the first computing device in response to a user selection of the corresponding selectable user interface element of the selected one of the plurality of image files.

13. The computer-implemented method of claim 1, further comprising:
receiving, by the computer system, a plurality of conversations between other users, each one of the conversations including the first image file and corresponding textual data displayed in association with the first image file as part of the conversation; and
generating, by the computer system, the first embedding vector of the first image file based on the first image file and the corresponding textual data of the plurality of conversations.

14. The computer-implemented method of claim 1, wherein the computer system comprises a remote server.

15. The computer-implemented method of claim 1, wherein the computer system comprises the second computing device.

16. A system comprising:
at least one hardware processor; and
a non-transitory machine-readable medium embodying a set of instructions that, when executed by the at least one hardware processor, cause the at least one processor to perform operations comprising:
detecting that a first message comprising a first image file has been transmitted from a first computing device of a first user to a second computing device of a second user;
generating a first plurality of smart replies based on a first embedding vector of the first image file, the first embedding vector of the first image file being based on at least one of first textual metadata of the first image file, first image data of the first image file, and a first set of query text used by a first set of users in a first set of searches that resulted in the first image file being included in a first set of transmitted messages, the first set of users comprising at least one other user different from the second user; and
causing each one of the first plurality of smart replies to be displayed on the second computing device of the second user as a corresponding selectable user interface element.

17. The system of claim 16, wherein the operations further comprise:
receiving a first user selection of one of the first plurality of smart replies from the second computing device; and
transmitting a second message including the selected one of the first plurality of smart replies to the first computing device in response to the receiving of the first user selection.

18. The system of claim 16, wherein each one of the first plurality of smart replies comprises a corresponding text or a corresponding image file.

19. A non-transitory machine-readable medium embodying a set of instructions that, when executed by at least one hardware processor, cause the processor to perform operations, the operations comprising:
detecting that a first message comprising a first image file has been transmitted from a first computing device of a first user to a second computing device of a second user;
generating a first plurality of smart replies based on a first embedding vector of the first image file, the first embedding vector of the first image file being based on at least one of first textual metadata of the first image file, first image data of the first image file, and a first set of query text used by a first set of users in a first set of searches that resulted in the first image file being included in a first set of transmitted messages, the first set of users comprising at least one other user different from the second user; and
causing each one of the first plurality of smart replies to be displayed on the second computing device of the second user as a corresponding selectable user interface element.

* * * * *